Dec. 26, 1933. H. DERSEN 1,941,391
MACHINE FOR WINDING DISK COILS
Filed Jan. 20, 1930

Inventor:
H. Dersen
By: Marks & Clerk
Attys.

Patented Dec. 26, 1933

1,941,391

UNITED STATES PATENT OFFICE 1,941,391

MACHINE FOR WINDING DISK COILS

Heinrich Dersen, St. Tonis, near Krefeld, Germany, assignor to firm Maschinenfabrik Carl Zangs, Aktiengesellschaft, Krefeld, Germany Application January 20, 1930, Serial No. 422,176, and in Germany January 28, 1929

7 Claims. (Cl. 242—18)

My invention relates to a machine for the winding of coils, more particularly of disk coils, that is to say, of coils which are wound upon a stationary coil body, usually consisting of wood, which is provided at both ends with fixed disks or flanges; the coil body not being mounted upon a spindle but being clamped between resilient pointed tips or the like.

The object of my invention is to provide a machine of this kind, the construction of which is compact and independent of the length of the coils.

A further object of my invention is to provide a machine which will be simple to construct and simple to operate, a single spring serving at the same time for clamping the coil and for pressing the friction wheel that drives the coil against a friction disk.

Finally another object of my invention is to provide a machine in which a gradual engagement of the driving means is possible, and in which therefore the coil begins to rotate slowly, and any sudden pulling and breaking of the thread is obviated.

Figure 1:
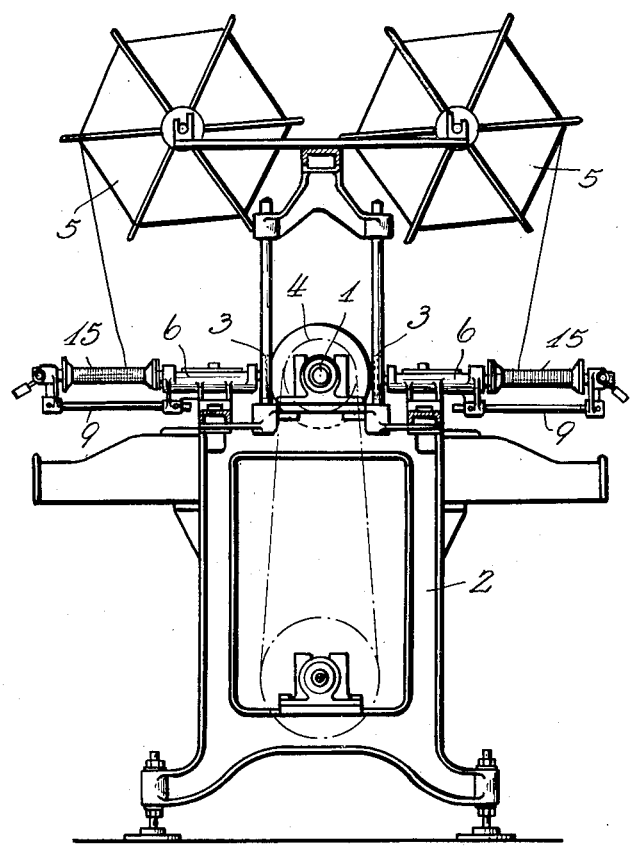

One constructional example of the machine is illustrated in the accompanying drawing, in which Figure 1 is a side elevation of the winding machine, the means for tensioning and guiding the thread being omitted.

Figure 2:
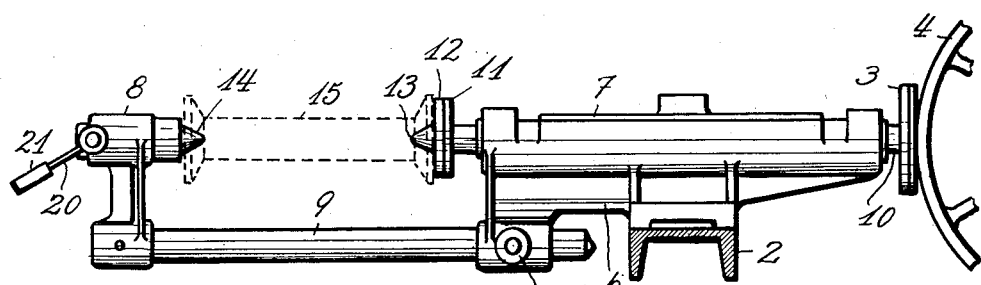
Figure 3:
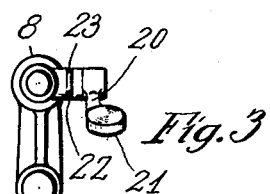
Figure 4:
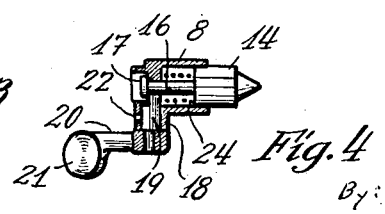

Figure 2 shows an example of a coil unit in side elevation, the driving means being engaged, Figure 3 is an end view of the coil unit shown in Figure 2, and Figure 4 is a section through the outer end of the coil unit shown in Figure 2 as seen from above.

The winding machine comprises a frame 2, and a shaft 1 journalled in the centre thereof, which extends throughout the entire breadth of the machine frame, and is driven by any suitable means, not shown. Upon the shaft 1 is mounted a number of friction disks 4, there being one friction disk for each two coil units located opposite to one another. The friction wheels 3 bear with one side of their surface on the periphery of the friction disk and are driven by it. The threads run off reels 5, which are provided at the upper part of the machine frame. Each thread is guided by a tension device and a reciprocating thread guide, which are both of the usual construction, and are not described or illustrated, since they do not form part of this invention.

For each coil unit there is provided on the machine frame 2 a fixed bracket 6, on which are located two bearings 7 and 8. The bearing 8 is preferably fitted to a rod 9, which is slidable in the bracket 6, and can be clamped by means of a clamping screw 9'. A shaft 10, rotatable and longitudinally slidable in the bearing 7, carries at one end the friction pinion 3, and at the other end a disk 11, which is preferably coated with frictional material 12, and carries in the centre a pointed tip 13.

In the bearing 8 is rotatably and slidably supported a second pointed tip 14, which is adapted, together with the pointed tip 13, to clamp the coil 15. The cylindrical part of the tip 14 carries on the outside a pin 16, which is provided at the end with a head 17. The bearing 8 is provided at the outer end with a lateral projection, in which a cylindrical body 19 is rotatably supported. The end of the cylinder 19 projecting out of the bearing carries a small lever 20, the end of which is constructed as a disk 21. On the cylinder 19 is mounted a pin 22, which engages in a slot 23 in the extension 18, this slot being so dimensioned that it limits the rotation of the cylinder 19 to about 90 degrees. Between the cylinder 19 and the point 14 is located a spring 24 surrounding the shank 16, this spring tending to force the tip 14 inwards. The head 17 is in this manner pressed against the cylinder 19, and the part of the cylinder 19 on which the head 17 bears is cut away approximately to the extent of one half, so that it forms a cam guide, by means of which the pointed tip 14 can be drawn back against the pressure of the spring 24 or allowed to move inwards under the pressure of the spring 24.

The method of working of the apparatus is as follows:—

The bearing 8 is so adjusted, by shifting the rod 9 and clamping it by means of the screw 9', according to the length of the coil 15 to be wound, that the spring 24, when it is permitted to push the pointed tip 14 forwards, presses the tip 14 against the coil 15 and presses the latter against the pointed tip 13 and the shaft 10, and thereby so displaces the shaft 10 that the friction wheel 3 bears on the friction disk 4, but is no longer pressed against the friction disk 4 when the pointed tip 14 is somewhat drawn back by the rotation of the cylinder 19, and the spring 24 is thereby somewhat compressed.

After the parts are thus adjusted the winding can begin. In the first place the lever 20 is rocked in such a way that the cam end of the cylinder 19 somewhat draws back the pointed tip 14, and thereupon the bobbin 15 is placed between the pointed tips 13 and 14, which is possible by further compressing the spring 24. The lever 20 is now slowly depressed, and the spring 24 thereby gradually set free, as a result of which the disk 3, in the manner described, is gradually pressed more and more firmly against the friction wheel 4, and the bobbin 15 is gradually set in rotation.

After the winding of the coil is finished, the lever 20 is rocked upwards again, whereby the spring 24 is again so far compressed that it no longer presses the friction wheel 3 against the friction disk 4. The coil 15 then stops, and can be taken out and replaced by a fresh bobbin.

What I claim is:—

1. A machine for winding bobbins, comprising a frame, a continuously revolving machine shaft journaled in the frame, friction disks secured to the machine shaft, and winding units adjacent to the machine shaft, the said winding units each comprising a bracket, a stationary bearing mounted on the bracket, a winding shaft rotatable and longitudinally slidable in the stationary bearing, a friction wheel secured to the winding shaft and adapted to be brought into and out of engagement with one of the friction disks on the machine shaft by longitudinal movement of the winding shaft, a second bearing mounted on the bracket in alinement with the said stationary bearing, a short shaft element longitudinally displaceable in the second bearing, the said shaft element and the winding shaft being adapted to hold a bobbin to be wound between their adjacent ends, means for pressing the shaft element against the bobbin and thereby displacing the winding shaft so as to bring the friction wheel mounted thereon into operative engagement with a friction disk on the machine shaft, and means for retracting the shaft element and thereby allowing the friction wheel to become disengaged from the friction disk.

2. A machine for winding bobbins, comprising a frame, a continuously revolving machine shaft journaled in the frame, friction disks secured to the machine shaft, and winding units adjacent to the machine shaft, the said winding units each comprising a stationary bearing, a winding shaft rotatable and longitudinally slidable in the stationary bearing, a friction wheel secured to the winding shaft and adapted to be brought into and out of engagement with one of the friction disks on the machine shaft by longitudinal movement of the winding shaft, frictional means on the winding shaft adapted to come into engagement with a bobbin to be wound, a second bearing mounted in alinement with the said stationary bearing, means on this second bearing for pressing the bobbin into engagement with the frictional means on the winding shaft and displacing the winding shaft lengthwise so as to bring the friction wheel mounted thereon into operative engagement with a friction disk on the machine shaft, and means for retracting the said engaging means, thereby allowing the friction wheel to become disengaged from the friction disk.

3. A machine for winding bobbins, comprising a frame, a continuously revolving machine shaft journaled in the frame, friction disks secured to the machine shaft, and winding units adjacent to the machine shaft, the said winding units each comprising a bracket, a stationary bearing mounted on the bracket, a winding shaft rotatable and longitudinally slidable in the stationary bearing, a friction wheel secured to the winding shaft and adapted to be brought into and out of engagement with one of the friction disks on the machine shaft by longitudinal movement of the winding shaft, a center tip at the outer end of the winding shaft adapted to engage with one end of a bobbin to be wound, a second center tip mounted on the bracket facing the first center tip and adapted to engage the other end of the bobbin, a spring tending to press the second center tip towards the first and thereby to displace the winding shaft lengthwise, if a bobbin is mounted between the center tips, so as to bring the friction wheel mounted thereon into operative engagement with a friction disk on the machine shaft, and means for retracting the second center tip against the pressure of the spring, thereby allowing the friction wheel to become disengaged from the friction disk.

4. A machine for winding coils on bobbins, comprising a frame, a machine shaft journalled in the frame, friction disks secured to the machine shaft, and winding units extending laterally in relation to the machine shaft, the said winding units each comprising an inner bearing extending perpendicularly to the machine shaft, a winding shaft journalled in the said bearing and longitudinally slidable therein, a friction wheel secured to the winding shaft and adapted to engage with a friction disk on the machine shaft, a centre tip at the outer end of the winding shaft adapted to enter into frictional engagement with one end of a bobbin, a longitudinally displaceable outer bearing in alignment with the inner bearing, means for clamping the outer bearing in position, a second centre tip slidably mounted in the outer bearing, a spring tending to press the second centre tip towards the first, and a rotatable device for retracting the second centre tip against the action of the spring and releasing it at will.

5. A machine for winding bobbins, comprising a frame, a machine shaft journaled in the frame, friction disks secured to the machine shaft, and winding units adjacent to the machine shaft, the said winding units each comprising a bearing bracket, an inner bearing on the bracket, a winding shaft journaled in the inner bearing and longitudinally slidable therein, a friction wheel secured to the winding shaft and adapted to be brought into and out of engagement with one of the friction disks on the machine shaft by longitudinal movement of the winding shaft, an outer bearing longitudinally displaceable on the bearing bracket in alinement with the inner bearing, means for clamping the outer bearing at a fixed distance from the inner bearing, an abutment slidably mounted in the outer bearing, this abutment and the winding shaft being adapted to hold a bobbin endwise between them, a spring tending to press the abutment towards the winding shaft, and means for retracting the abutment against the action of the spring.

6. A machine for winding bobbins, comprising a frame, a machine shaft journaled in the frame, friction disks secured to the machine shaft, and winding units adjacent to the machine shaft, the said winding units each comprising a rotatable and longitudinally slidable winding shaft, a friction wheel secured to the winding shaft and adapted to be brought into and out of engagement with one of the friction disks on the machine shaft by longitudinal movement of the winding shaft, a longitudinally displaceable abutment in alinement with the winding shaft, the said abutment and winding shaft being adapted to hold a bobbin to be wound between their adjacent ends, a spring tending to press the abutment towards the winding shaft, and thereby, if there is a bobbin between the abutment and the winding shaft, to displace the winding shaft longitudinally so as to bring the friction wheel mounted thereon into operative engagement with a friction disk on the machine shaft, a cam adapted to retract the abutment against the action of the spring, and a manually operable lever for actuating the cam.

7. In a bobbin-winding machine, friction disks, means for continuously rotating the friction disks, and winding units each adapted to be driven by one of the friction disks, each winding unit comprising a bracket, a stationary bearing mounted on the bracket, a shaft rotatable and longitudinally displaceable in the said bearing, a friction wheel secured to the said shaft and adapted to engage and be driven by one of the friction disks, a second bearing mounted on the bracket in alinement with the said stationary bearing, a second shaft longitudinally displaceable in the second bearing, the two displaceable shafts being adapted to hold a bobbin between them, means tending to displace these two shafts, together with a bobbin held between them and the friction wheel, so as to press the friction wheel into engagement with the corresponding friction disk, and means for counteracting at will this displacing tendency and keeping it counteracted, thereby allowing the friction wheel to become and to remain disengaged from the friction disk.

HEINRICH DERSEN.